(12) United States Patent
Han et al.

(10) Patent No.: US 9,028,914 B2
(45) Date of Patent: May 12, 2015

(54) METHOD FOR MANUFACTURING HIGH-DENSITY FIBER REINFORCED CERAMIC COMPOSITE MATERIALS

(75) Inventors: In-Sub Han, Chungcheongnam-do (KR); Se-Young Kim, Seongnam-si (KR); Sang-Kuk Woo, Daejeon (KR); Doo-Won Seo, Daejeon (KR); Kang Bai, Seoul (KR); Ji-Haeng Yu, Daejeon (KR); Sun-Dong Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 652 days.

(21) Appl. No.: 13/403,173

(22) Filed: Feb. 23, 2012

(65) Prior Publication Data

US 2013/0011654 A1    Jan. 10, 2013

(30) Foreign Application Priority Data

Jul. 7, 2011    (KR) .................. 10-2011-0067251

(51) Int. Cl.
*C04B 35/00*    (2006.01)
*C04B 35/571*    (2006.01)
(Continued)

(52) U.S. Cl.
CPC ............ *C04B 35/571* (2013.01); *C04B 35/573* (2013.01); *C04B 35/62863* (2013.01); *C04B 35/62873* (2013.01); *C04B 35/62894* (2013.01); *C04B 35/806* (2013.01); *C04B 2235/424* (2013.01); *C04B 2235/428* (2013.01); *C04B 2235/48* (2013.01); *C04B 2235/483* (2013.01); *C04B 2235/5244* (2013.01); *C04B 2235/5248* (2013.01); *C04B 2235/5454* (2013.01);

(Continued)

(58) Field of Classification Search
CPC .................. C04B 35/62844; C04B 35/62863; C04B 35/62873
See application file for complete search history.

(56) References Cited

U.S. PATENT DOCUMENTS 5,273,941 A * 12/1993 Enomoto et al. ................ 501/88
5,962,103 A    10/1999 Luthra et al.
2003/0145934 A1* 8/2003 Tani ......................... 156/89.11

FOREIGN PATENT DOCUMENTS

| DE | 198 15 308 | 10/1999 |
| DE | 198 15 309 | 10/1999 |
| EP | 1 084 997 | 3/2001 |

OTHER PUBLICATIONS

Extended European Search Report for European patent application No. 12156920.6, dated Jul. 27, 2012 (5 pages).

*Primary Examiner* — Robert Vetere
(74) *Attorney, Agent, or Firm* — Hamre, Schumann, Mueller & Larson, P.C.

(57) ABSTRACT

Disclosed herein is a method of manufacturing a high-density fiber reinforced ceramic composite material, including the steps of: 1) impregnating a fiber preform material multi-coated with pyrolytic carbon and silicon carbide to form impregnated fiber reinforced plastic composite material; 2)carbonizing the impregnated fiber reinforced plastic composite material to form carbonized fiber composite material; 3) a primary reaction-sintering of the fiber composite material; 4) cooling the primarily reaction-sintered fiber composite material down to room temperature and then impregnating the primarily reaction-sintered fiber composite material with a solution in which a polymer precursor for producing silicon carbide (SiC) is dissolved in a hexane (n-hexane) solvent; and 5) a secondary reaction-sintering of the fiber composite material; and a high-density fiber reinforced ceramic composite material manufactured using the method.

11 Claims, 3 Drawing Sheets

(51) Int. Cl.
*C04B 35/573* (2006.01)
*C04B 35/628* (2006.01)
*C04B 35/80* (2006.01)
*B82Y 30/00* (2011.01)

(52) U.S. Cl.
CPC ..... *C04B2235/614* (2013.01); *C04B 2235/616* (2013.01); *C04B 2235/6562* (2013.01); *C04B 2235/77* (2013.01); *C04B 2235/96* (2013.01); *B82Y 30/00* (2013.01)

METHOD FOR MANUFACTURING HIGH-DENSITY FIBER REINFORCED CERAMIC COMPOSITE MATERIALS

CROSS REFERENCE TO RELATED APPLICATION

This application claims the benefit of Korean Patent Application No. KR 10-2011-0067251, filed Jul. 7, 2011, which is hereby incorporated by reference in its entirety into this application.

BACKGROUND OF THE INVENTION

1. Technical Field

The present invention relates to a method of manufacturing a high-density fiber reinforced ceramic composite material and to a high-density fiber reinforced ceramic composite material manufactured using the method.

2. Description of the Related Art

Owing to the need to greatly improve industrial structures and improve energy efficiency, there is an increasing need for the development of materials exhibiting functions in such extreme environments as an ultrahigh temperature environment or the like. Fiber reinforced ceramic composite materials are materials exhibiting high toughness, excellent corrosion resistance and high reliability even in such extreme environments as a ultrahigh temperature environment, and are required in various fields, such as in dust filters for diesel automobiles, aerospace, atomic energy, etc.

In order for fiber reinforced ceramic composites materials to exhibit excellent characteristics in extreme environments, a high-strength heat-resistant ceramic fiber is used as a basic element, and methods of weaving and densifying this fiber into a desired shape are required.

Methods of manufacturing a fiber reinforced ceramic composite material include chemical vapor infiltration (CVI), polymer impregnation and pyrolysis (PIP), reaction sintering and combinations thereof.

Chemical vapor infiltration (CVI) is advantageous in that the damage of fiber attributable to high temperature can be minimized because a SiC matrix phase is deposited between SIC fibers using gas as a starting material under a process temperature of about 1000° C. However, chemical vapor infiltration (CVI) is problematic in that it takes several tens of hours to conduct high-density deposition, pores remain in the fiber reinforced ceramic composite material, and the manufacturing cost of the fiber reinforced ceramic composite material is high. In particular, chemical vapor infiltration (CVI) is problematic in that it is difficult to manufacture a high-density ceramic composite material having a thickness of 4 mm or more because SiC matrix phase is first deposited on the surface of a ceramic preform material, and is thus not easily deposited inside of it.

Polymer impregnation and pyrolysis (PIP) is problematic that it takes a lot of time to manufacture a fiber reinforced ceramic composite material because a compact matrix can be prepared by repeatedly conducting processes of polymer impregnation→carbonization→impregnation 5~10 times. Conventional reaction sintering is also problematic in that the density and mechanical strength of the manufactured fiber reinforced ceramic composite material become low because the content of silicon (free Si) remaining in a matrix is high.

SUMMARY OF THE INVENTION

Accordingly, the present invention has been devised to solve the above problems, and an object of the present invention is to provide a method of manufacturing a high-density fiber reinforced ceramic composite material having a high density matrix structure and having high strength, high temperature resistance, excellent corrosion resistance and high reliability even in extreme environments such as an ultrahigh temperature environment or the like without using high-priced equipment for a short period of time, and a high-density fiber reinforced ceramic composite material manufactured using the method.

In order to accomplish the above object, an aspect of the present invention provides a method of manufacturing a high-density fiber reinforced ceramic composite material, including the steps of 1) impregnating a fiber preform material multi-coated with pyrolytic carbon and silicon carbide with a slurry in which a phenol resin is mixed with a filler including carbon powder and metal silicon powder, to form a impregnated fiber reinforced plastic composite material; 2) carbonizing the impregnated fiber reinforced plastic composite material to form a carbonized fiber composite material; 3) heat-treating the carbonized fiber composite material in a vacuum atmosphere to melt the filler and then diffusing the molten filler into the carbonized fiber composite material to obtain a primarily reaction-sintered fiber composite material, as a primary reaction-sintering of the fiber composite material; 4) cooling the primarily reaction-sintered fiber composite material down to room temperature and then impregnating the primarily reaction-sintered fiber composite material with a solution in which a polymer precursor for producing silicon carbide (SiC) is dissolved in a hexane (n-hexane) solvent; and 5) applying metal silicon powder onto the surface of the primarily reaction-sintered fiber composite material impregnated with the polymer precursor to bring the metal silicon powder into contact with the primarily reaction-sintered fiber composite material, melting the metal silicon powder in a vacuum atmosphere and then diffusing the molten metal silicon powder into the primarily reaction-sintered fiber composite material to obtain a secondarily reaction-sintered fiber composite material, as a secondary reaction-sintering of the fiber composite material.

Another aspect of the present invention is to provide a high-density fiber reinforced ceramic composite material, manufactured by the method.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
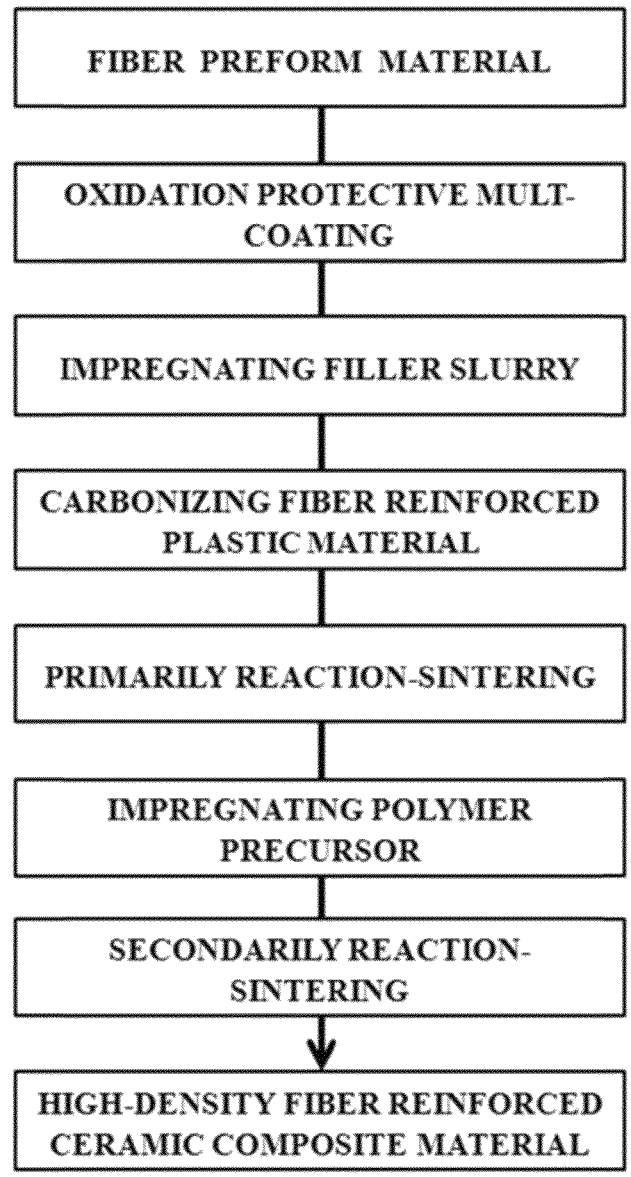
FIG. 1 is a flowchart showing a method of manufacturing a high-density fiber reinforced ceramic composite material according to the present invention.

Hereinafter, preferred embodiments of the present invention will be described in detail.

The present invention provides a method of manufacturing a high-density fiber reinforced ceramic composite material, including the steps of 1) impregnating a fiber preform material multi-coated with pyrolytic carbon and silicon carbide with a slurry in which a phenol resin is mixed with a filler including carbon powder and metal silicon powder, to form a impregnated fiber reinforced plastic composite material; 2) carbonizing the impregnated fiber reinforced plastic composite material to form a carbonized fiber composite material; 3) heat-treating the carbonized fiber composite material in a vacuum atmosphere to melt the filler and then diffusing the molten filler into the carbonized fiber composite material to obtain a primarily reaction-sintered fiber composite material, as a primary reaction-sintering of the fiber composite material; 4) cooling the primarily reaction-sintered fiber composite material down to room temperature and then impregnating the primarily reaction-sintered fiber composite material with a solution in which a polymer precursor for producing silicon carbide (SiC) is dissolved in a hexane (n-hexane) solvent; and 5) applying metal silicon powder onto the surface of the primarily reaction-sintered fiber composite material impregnated with the polymer precursor to bring the metal silicon powder into contact with the primarily reaction-sintered fiber composite material, melting the metal silicon powder in a vacuum atmosphere and then diffusing the molten metal silicon powder into the primarily reaction-sintered fiber composite material to obtain a secondarily reaction-sintered fiber composite material, as a secondary reaction-sintering of the fiber composite material.

In the method of manufacturing a high-density fiber reinforced ceramic composite material, the fiber preform material in step 1) may be formed of a carbon fiber, a silicon carbide fiber or the like, but is not particularly limited as long as it is commonly used in the related field. As the carbon fiber, a polyacrylonitrile fiber, a rayon fiber, a pitch fiber or the like may be used.

Further, the form of the carbon fiber or the silicon carbide fiber is not particularly limited as long as it is commonly used in the related field, but, preferably, the form thereof may be a fabric loosely formed by spinning, weaving, knitting or the like in order to perform an impregnation process as a post-process. Preferably, the carbon fiber or the silicon carbide fiber may be woven two-dimensionally, but may also be woven three-dimensionally or four-dimensionally.

In the method, the multi-coating of the fiber preform material in step 1) is performed in order to prevent the fiber preform material from being oxidized. For example, the multi-coating of the fiber preform material may be performed by respectively coating the fiber preform material with pyrolytic carbon and silicon carbide one or more times, but is not limited thereto as long as it is commonly known in the related field.

In the method, the multi-coating of the fiber preform material in step 1) may be performed by coating the fiber preform material with pyrolytic carbon in an atmosphere including propane gas and nitrogen gas at a volume ratio of 1:10~10:1 and then further coating the fiber preform material with silicon carbide in an atmosphere including propane gas and monosilane ($SiH_4$) gas at a volume ratio of 3:1~1:3.

Concretely, the fiber preform material is introduced into an electric furnace having an atmosphere including propane gas and nitrogen gas at a volume ratio of 1:10~10:1, and is then coated with pyrolytic carbon by propane gas pyrolyzed in the electric furnace heated to 900° C.~1,000° C. Here, the volume ratio of propane gas to nitrogen gas may be 1:10, but is not limited thereto.

The fiber preform material coated with pyrolytic carbon may be secondarily coated using silicon carbide. When the fiber preform material is coated with silicon carbide, a silane compound, preferably, monosilane ($SiH_4$) gas may be used.

Concretely, the fiber preform material coated with pyrolytic carbon is introduced into an electric furnace having an atmosphere including propane gas and monosilane ($SiH_4$) gas at a volume ratio of 3:1~1:3, and is then coated with silicon carbide by monosilane ($SiH_4$) gas pyrolyzed in the electric furnace heated to 900° C.~1,000° C. Here, the volume ratio of propane gas to monosilane ($SiH_4$) gas may be 1:1.

In the present invention, a pyrolytic coating method using graphite is not used because it must be performed at a high temperature of 2,000 or higher.

In the method, in step 1), the filler including carbon powder and metal silicon powder may be mixed with the phenol resin in an amount of 5~40 parts by weight, preferably, 10~25 parts by weight, based on 100 parts by weight of the phenol resin. When the amount of the filler is present within the above range, there is an advantage in that the matrix of a fiber reinforced silicon carbide composite material, which is a final product, becomes highly densified. However, when the amount of the filler is more than 40 parts by weight, there is a problem in that the solid content of the filler in the phenol resin increases, so that it is impossible to impregnate the filler containing the phenol resin into the pores of the fiber preform material. In contrast, when the amount of the filler is less than 5 parts by weight, there is a problem in that the matrix thereof does not become highly densified. As described above, in the case where the phenol resin includes the filler, when the phenol resin is impregnated into the fiber preform material, the carbon powder and metal silicon powder included in the filler is also impregnated thereinto together with the phenol resin, thus improving the density, strength and toughness of the fiber reinforced ceramic composite material. More concretely, in the case where the phenol resin includes carbon powder and silicon powder as filler, in the final heat treatment step, the carbon powder and silicon powder included as additives primarily react with each other in the carbonized fiber composite material to form silicon carbide particles, and molten silicon is diffused into the primarily reaction-sintered fiber composite material and secondarily reacts with other carbon components to form new silicon carbide particles, so that a more densified final product is manufactured in comparison to when only carbon is used as an additive, thereby improving the mechanical properties of the final product.

The size of the carbon powder and silicon powder constituting the filler may be 0.05~3 μm, but is not particularly limited as long as it is used in the related field. The carbon powder and metal silicon powder may be included in a weight ratio of 1:6~6:1. It is preferred that the amount of the carbon powder included in the filler be greater than that of the metal silicon powder. For example, the weight ratio of carbon powder to metal silicon powder may be 6:1~1:1, preferably, 4:1~1:1. When the filler including a larger amount of carbon powder is mixed with the phenol resin and then impregnated into the fiber preform material, there is an advantage in that the matrix of the fiber reinforced ceramic composite material (final product) becomes more dense. The reason for this is because excess carbon remaining in the matrix of the primarily reaction-sintered fiber composite material reacts with the metal silicon applied to the surface of the fiber molding material in step 5) to produce silicon carbide (SiC) in the matrix of the primarily reaction-sintered fiber composite material, and this produced silicon carbide (SiC) influences the matrix of the fiber reinforced ceramic composite material (final product).

In the method, the impregnating of the fiber preform material in step 1) may be performed by any one selected from vacuum assisted resin transfer molding (VARTM), resin transfer molding (RTM) and vacuum impregnation (VI).

The method may further include the step of curing the impregnated fiber reinforced plastic composite material at 80~150° C. after step 1). When the impregnated fiber reinforced plastic composite material is cured, the shape of the impregnated fiber reinforced plastic composite material can be fixed.

In the method, the carbonizing of the impregnated fiber reinforced plastic composite material in step 2) can be performed by the method commonly known in the related field, and, particularly, may be performed by heating the impregnated fiber reinforced plastic composite material from room temperature to 1000° C. or lower at a heating rate of 1~2° C./min in an atmosphere including nitrogen. When the impregnated fiber reinforced plastic composite material is heated to the above temperature, organic matter included in the phenol resin is burned, and thus only the carbon component remains in the matrix of the carbonized fiber composite material. It is preferred that the ratio of carbon remaining in the phenol resin be 40~60%.

In the method, the primarily reaction-sintering of the fiber composite material in step 3) may be performed by heating the carbonized fiber composite material from room temperature to 1500° C. or lower at a heating rate of 1~7° C./min in a vacuum atmosphere to form a heated and carbonized fiber composite material and then sintering the heated and carbonized fiber composite material for 10~60 minutes.

When the carbonized fiber composite material is primarily sintered under the above conditions, the metal silicon used in step 1) is diffused into the carbonized fiber composite material, and the diffused metal silicon reacts with the carbon component in the matrix of the carbonized fiber composite material to produce new silicon carbide particles in the matrix thereof. The silicon carbide particles produced in the matrix thereof are charged in cavities between fiber bundles, and the diffused metal silicon is charged in other cavities in the state of free-silicon (free-Si), so the carbonized fiber composite material can be sintered more densely.

In the method, the polymer precursor for producing silicon carbide (SiC) in step 4) may be a silane-based polymer precursor, preferably, polycarbosilane.

Concretely, the primarily reaction-sintered fiber composite material in step 3) is impregnated into a solution in which polycarbosilane is dissolved in a hexane (n-hexane) solvent under atmospheric pressure. The polycarbosilane may be mixed with the hexane solvent in an amount of 50~70 parts by weight based on 100 parts by weight of the hexane solvent. However, the mixing ratio of polycarbosilane to hexane may be adjusted depending on the molecular weight of polycarbosilane.

In the method, the secondarily reaction-sintering of the fiber composite material in step 5) may be performed by heating the primarily reaction-sintered fiber composite material from room temperature to 1650° C. or lower at a heating rate of 1~7° C./min, heat-treating the heated fiber composite material for 10~30 minutes and then sintering the heat-treated fiber composite material for 10~60 minutes.

Here, pure metal silicon powder is used as the metal silicon, and the particle size of the metal silicon is not particularly limited as long as the particle size thereof is commonly used in the related field. The silicon powder included in the 'phenol resin as an additive and impregnated into the fiber composite material may have a particle size of 0.05~3μm, but the metal silicon particles melted in the step of final heat treatment and infiltrated into the fiber composite material may be rough and large particles having a size of 1~3 mm, but are not limited thereto. The amount of the metal silicon coming into contact with the surface of the fiber composite material may be determined depending on the density of the fiber composite material formed in step 4), and may be 100~200 parts by weight based on 100 parts by weight of the fiber composite material formed in step 4). The amount of free-silicon (free-Si) included in the fiber reinforced ceramic composite material obtained in step 5) may be adjusted such that the amount thereof is 10~20 wt %, preferably, 10~15 wt %.

When the carbonized fiber composite material is secondarily reaction-sintered under the above conditions, the molten metal silicon is diffused into the carbonized fiber composite material by capillary force, and thus reacts with the carbon component remaining in the matrix of the fiber composite material to reproduce silicon carbide particles, so that the secondarily reaction-sintered fiber composite material is more compact than the primarily reaction-sintered fiber composite material.

Further, the present invention provides a high-density fiber reinforced ceramic composite material manufactured by the above method.

The high-density fiber reinforced ceramic composite material of the present invention is a first ceramic composite material manufactured by impregnating a fiber preform material into a slurry, in which a phenol resin is mixed with a filler including carbon powder and metal silicon powder, and then further impregnating the primarily reaction-sintered fiber composite material into a solution containing a polymer precursor for producing silicon carbide (SiC), and includes free-silicon (free-Si) in an amount of 10~20 wt %.

The silicon carbide (SiC), which is a ceramic material having excellent thermal and mechanical properties, is produced in the matrix of a fiber composite material by the reaction [Si+C→SiC] between metal silicon and carbon, and serves to make the high density composite structure.

Although the manufacturing time and cost of the ceramic composite material of the present invention is reduced compared to those of a conventional ceramic composite material, this ceramic composite material has a dense matrix structure, so that this ceramic composite material can be usefully used in various fields, such as in dust filters for diesel automobiles, aerospace, atomic energy, etc., which require high strength, high toughness, excellent corrosion resistance and high reliability even in extreme environments such as a ultrahigh temperature environment or the like.

Hereinafter, the present invention will be described in more detail with reference the following Examples, Comparative Example and Experimental Example.

However, these Examples are set forth to illustrate the present invention, and the scope of the present invention is not limited thereto.

Example 1 to 4 and Comparative Example 1

Manufacture of High-Density Fiber Reinforced Ceramic Composite Materials

A fiber preform material made of a polyacrylonitrile fiber (manufactured by Toray Co., Ltd., brand name: T-300) was introduced into an electric furnace, to which propane ($C_3H_8$) gas and nitrogen ($N_2$) gas can be quantitatively supplied at a volume ratio of 1:10, and was then primarily coated with pyrolytic carbon at 900° C. for 8 hours. Thereafter, propane ($C_3H_8$) gas and monosilane ($SiH_4$) gas were simultaneously supplied to the electric furnace, and thus the fiber preform material was secondarily coated with silicon carbide to form a PyC-SiC multi-coating layer.

Subsequently, the multi-coated fiber preform material was impregnated with filler slurry in order to make the matrix thereof compact. The filler slurry, which is a mixture of a phenol resin and a filler including silicon powder and carbon black powder, was prepared by mixing the phenol resin with the filler at the composition ratio given in Table 1 below and then stirring the mixture for 1 hour or more. The phenol resin used to manufacture a high-density fiber reinforced ceramic composite material had a residual carbon ratio of 55~60% when it was heat-treated in a nitrogen gas atmosphere of 1,000° C., and the silicon powder and the carbon black powder had average particles sizes of 1 μm and 0.07 μm, respectively.

That is, the fiber preform material coated with pyrolytic carbon was impregnated with the filler slurry by vacuum impregnation (VI) wherein the filler slurry is put into a pressure-controllable container and the pressure in the container is reduced by a vacuum pump.

Subsequently, the fiber preform material impregnated with the filler slurry was heated to 80~150☐ in an oven to cure the phenol resin, and was then heat-treated at 1000☐ in an electric furnace maintaining a nitrogen gas atmosphere to carbonize the fiber reinforced plastic composite material.

Subsequently, the carbonized fiber composite material was heated from room temperature to 1500° C. or lower at a heating rate of 1~7° C./min in a vacuum atmosphere, and was then sintered for 10~60 minutes to primarily reaction-sinter the fiber composite material.

Thereafter, the primarily reaction-sintered fiber composite material was impregnated with a solution in which polycarbosilane, as a polymer precursor, is dissolved in a hexane (n-hexane) solvent in an amount of 50~70 parts by weight based on 100 parts by weight of the hexane solvent.

The primarily reaction-sintered fiber composite material impregnated with the polycarbosilane solution was put into a graphite crucible coated with boron nitride (BN), and then rough metal silicon powder was placed on the primarily reaction-sintered fiber composite material at a weight ratio of 150% based on the carbonized fiber composite material to secondarily reaction-sinter the fiber composite material. That is, metal silicon was melted at 1600~1650° C. for 10~30 minutes in an electric furnace maintaining a vacuum atmosphere, and then the molten metal silicon was infiltrated into the primarily reaction-sintered fiber composite material to manufacture a fiber reinforced silicon carbide composite material.

TABLE 1

|   | Phenol resin (wt %) | Silicon (wt %) | Carbon black (wt %) |
|---|---|---|---|
| Exp. 1 | 100 | 5 | 5 |
| Exp. 2 | 100 | 5 | 10 |
| Exp. 3 | 100 | 5 | 15 |
| Exp. 4 | 100 | 5 | 20 |
| Comp. Exp. 1 | 100 | 0 | 0 |

Experimental Example 1

Evaluation of Characteristics of High-Density Fiber Reinforced Ceramic Composite Materials In order to evaluate the characteristics of the high-density fiber reinforced ceramic composite material manufactured by the method of the present invention, the sintered density, porosity and bending strength thereof were measured.

The composite materials of Examples 1 to 4 and Comparative Example 1, manufactured under the conditions given in Table 1 above, were fabricated into samples having a size of 40 mm×4 mm×3 mm (length×width×height), each of the samples was boiled in water for 3 hours, the suspended weight, saturated weight and dried weight of each of the samples were measured, and then the sintered density and porosity of each of the samples were calculated using the method of Archimedes.

Further, the bending strength of each of the samples was measured as three-point bending strength using a universal testing machine (S-series, Houndsfield, U.K.). The three-point bending strength of each of the samples was measured by cutting a tubular sintered filter support to a size of 40 mm×4 mm×3 mm (length×width×height) and then beveling each edge thereof. The three-point bending strength thereof was measured at a cross head speed of 0.1 mm/min.

TABLE 2

|   | Sintered density (g/cm$^3$) | Porosity (%) | Three-point bending strength at room temperature (MPa) | Three-point bending strength at high temperature (MPa, 1200° C.) |
|---|---|---|---|---|
| Exp. 1 | 2.09 | 7 | 162 | 142 |
| Exp. 2 | 2.10 | 5 | 170 | 146 |
| Exp. 3 | 2.11 | 5 | 177 | 148 |
| Exp. 4 | 2.15 | 5 | 168 | 149 |
| Comp. Exp. 1 | 2.06 | 7 | 149 | 100 |

Figure 2:
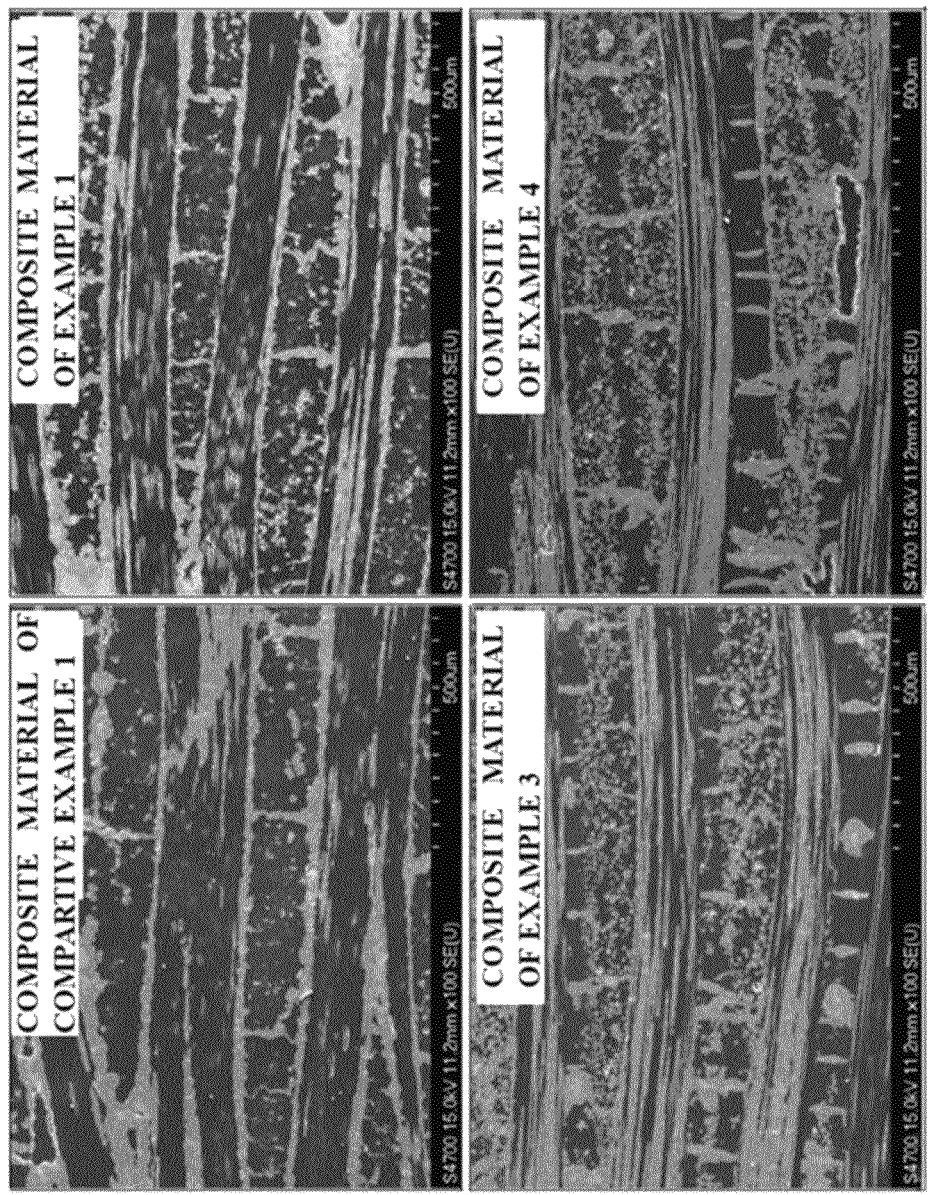
FIG. 2 is photographs showing the microstructures of the polished surfaces of high-density fiber reinforced ceramic composite materials manufactured by the method of the present invention.
Figure 3:
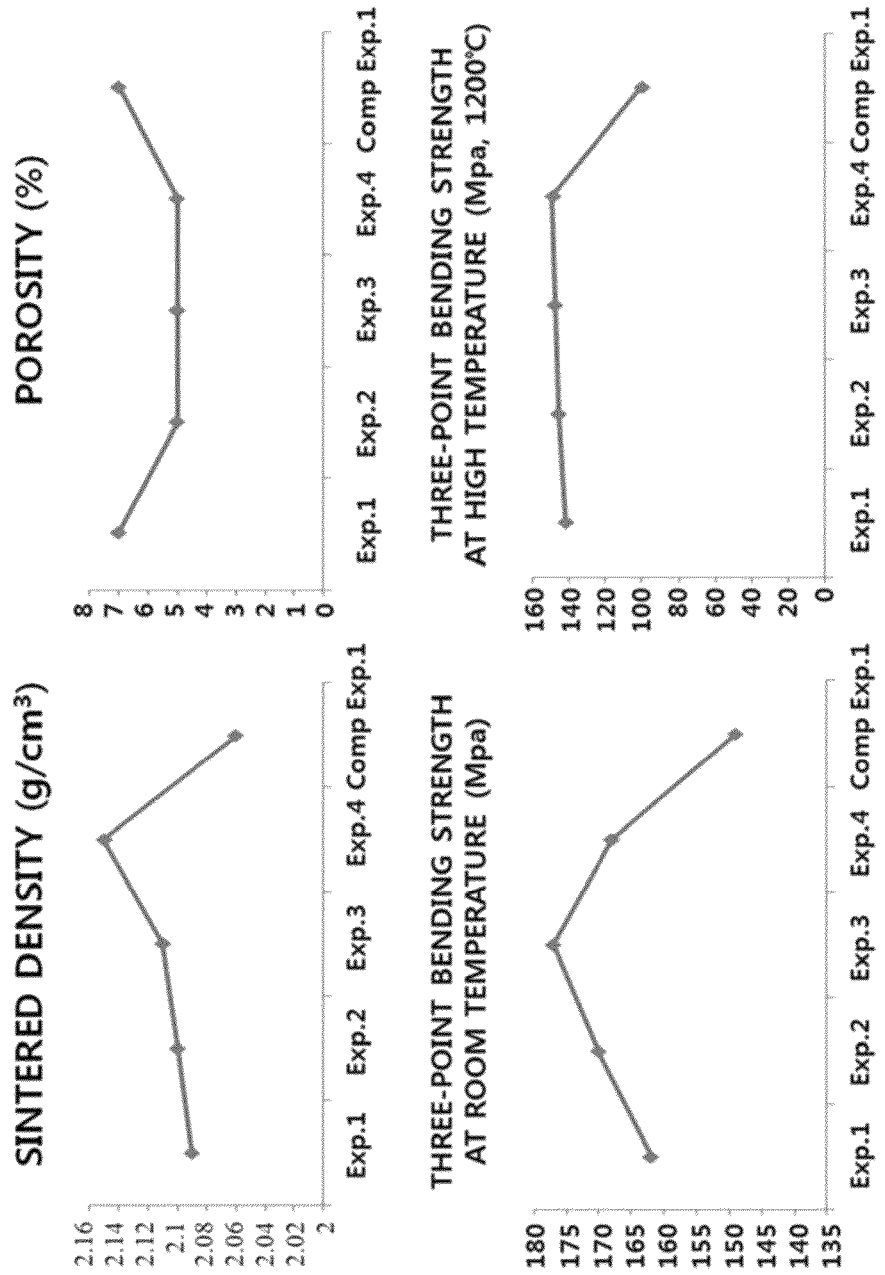
FIG. 3 is graphs showing the results of analyzing the characteristics of high-density fiber reinforced ceramic composite materials manufactured by the method of the present invention.

Referring to Table 2 above, it can be seen that the sintered density and bending strength of the composite materials of Examples 1 to 4 are higher than those of the composite material of Comparative Example 1, and that the porosity of the composite materials of Examples 1 to 4 is lower than that of the composite material of Comparative Example 1 (refer to FIG. 3). Further, as the result of the analysis of the microstructure of the polished surfaces of the composite materials, as shown in FIG. 2, it can be ascertained that the composite materials of Examples 1 to 4 are sufficiently filled with the silicon carbide particles produced by the method of the present invention and free silicon (free-Si) (Neat resin: composite material of Comparative Example 1, CB-5: composite material of Example 1, CB-15: composite material of Example 3, and CB-20: composite material of Example 4).

Therefore, it can be seen that the composite material manufactured by the method of the present invention has high compactness and bending strength.

As described above, the method of manufacturing a high-density fiber reinforced ceramic composite material according to the present invention is advantageous in that it can solve the problem of oxidation stability at high temperature by multi-coating a fiber preform material with a carbon material.

Further, the method of the present invention includes the steps of impregnating a fiber preform material with a mixture of a phenol resin, carbon powder and metal silicon powder, producing silicon carbide (SiC) in the fiber composite material using a polymer precursor to primarily reaction-sinter the fiber composite material, and infiltrating molten metal silicon powder into the primarily reaction-sintered fiber composite material to secondarily reaction-sinter the fiber composite material. For this reason, this method is advantageous in that it can make the matrix of the fiber reinforced ceramic composite material more dense.

Further, the method of the present invention is advantageous in that a high-density fiber reinforced ceramic composite material can be manufactured by a simple process for a short period of time without using high-priced equipment, thus reducing the manufacturing cost thereof and manufacturing a large-area product.

Further, the high-density fiber reinforced ceramic composite material manufactured by the method of the present invention has a compact matrix structure, and can be usefully used in various fields, such as dust filters for diesel automobiles, aerospace, atomic energy, etc., which require high strength, high toughness, excellent corrosion resistance and high reliability even in such extreme environments as an ultrahigh temperature environment or the like.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a high-density fiber reinforced ceramic composite material, comprising the steps of:
    1) impregnating a fiber preform material multi-coated with pyrolytic carbon and silicon carbide with a slurry in which a phenol resin is mixed with a filler including carbon powder and metal silicon powder, to form a impregnated fiber reinforced plastic composite material;
    2) carbonizing the impregnated fiber reinforced plastic composite material to form a carbonized fiber composite material;
    3) heat-treating the carbonized fiber composite material in a vacuum atmosphere to melt the filler and then diffusing the molten filler into the carbonized fiber composite material to obtain a primarily reaction-sintered fiber composite material, as a primary reaction-sintering of the fiber composite material;
    4) cooling the primarily reaction-sintered fiber composite material down to room temperature and then impregnating the primarily reaction-sintered fiber composite material with a solution in which a polymer precursor for producing silicon carbide (SiC) is dissolved in a hexane (n-hexane) solvent; and
    5) applying metal silicon powder onto the surface of the primarily reaction-sintered fiber composite material impregnated with the polymer precursor to bring the metal silicon powder into contact with the primarily reaction-sintered fiber composite material, melting the metal silicon powder in a vacuum atmosphere and then diffusing the molten metal silicon powder into the primarily reaction-sintered fiber composite material to obtain a secondarily reaction-sintered fiber composite material, as a secondary reaction-sintering of the fiber composite material.

2. The method according to claim 1, wherein, in step 1), the multi-coating of the fiber preform material is performed by coating the fiber preform material with pyrolytic carbon in an atmosphere including propane gas and nitrogen gas at a volume ratio of 1:10~10:1 and then further coating the fiber preform material with silicon carbide in an atmosphere including propane gas and monosilane ($SiH_4$) gas at a volume ratio of 3:~1:3.

3. The method according to claim 1, wherein, in step 1), the filler is mixed with the phenol resin in an amount of 5~40 parts by weight based on 100 parts by weight of the phenol resin.

4. The method according to claim 3, wherein, in step 1), the filler includes carbon powder and metal silicon powder in a weight ratio of 1:6~6:1.

5. The method according to claim 1, wherein, in step 1), the impregnating of the fiber preform material is performed by any one selected from vacuum assisted resin transfer molding (VARTM), resin transfer molding (RTM) and vacuum impregnation (VI).

6. The method according to claim 1, further comprising the step of curing the impregnated fiber reinforced plastic composite material at 80~150° C. after step 1).

7. The method according to claim 1, wherein, in step 2), the carbonizing of the impregnated fiber reinforced plastic composite material is performed by heating the impregnated fiber reinforced plastic composite material from room temperature to 1000° C. or lower at a heating rate of 1~2° C./min in an atmosphere including nitrogen.

8. The method according to claim 1, wherein, in step 3), the primary reaction-sintering of the fiber composite material is performed by heating the carbonized fiber composite material to 1500° C. or lower at a heating rate of 1~7° C./min in a vacuum atmosphere to form a heated and carbonized fiber composite material and then sintering the heated and carbonized fiber composite material for 10~60 minutes.

9. The method according to claim 1, wherein, in step 4), the polymer precursor for producing silicon carbide (SiC) is polycarbosilane.

10. The method according to claim 1, wherein, in step 5), the secondary reaction-sintering of the fiber composite material is performed by heating the primarily reaction-sintered fiber composite material from room temperature to 1650° C. or lower at a heating rate of 1~7° C./min, heat-treating the heated fiber composite material for 10~30 minutes and then sintering the heat-treated fiber composite material for 10~60 minutes.

11. The method according to claim 1, wherein the fiber preform material is a carbon fiber or a silicon carbide fiber.

* * * * *